(12) United States Patent
Powe et al.

(10) Patent No.: US 7,877,207 B2
(45) Date of Patent: Jan. 25, 2011

(54) CORRECTION OF TROPOSPHERE INDUCED ERRORS IN GLOBAL POSITIONING SYSTEMS

(75) Inventors: Matthew Duncan Powe, Hampshire (GB); James Butcher, Hampshire (GB); John Ifor Rewbridge Owen, Hampshire (GB)

(73) Assignee: The Secretary of State for Defence in Her Britannic Majesty's Government of the United Kingdom of Great Britain and Northern Ireland (GB)

( * ) Notice: Subject to any disclaimer, the term of this patent is extended or adjusted under 35 U.S.C. 154(b) by 1044 days.

(21) Appl. No.: 10/553,682

(22) PCT Filed: Apr. 19, 2004

(86) PCT No.: PCT/GB2004/001676

§ 371 (c)(1),
(2), (4) Date: Sep. 7, 2006

(87) PCT Pub. No.: WO2004/095055

PCT Pub. Date: Nov. 4, 2004

(65) Prior Publication Data

US 2007/0027624 A1  Feb. 1, 2007

(30) Foreign Application Priority Data

Apr. 17, 2003  (GB) ................................. 0308894.5
Apr. 23, 2003  (GB) ................................. 0309142.8

(51) Int. Cl.
*G01S 5/00* (2006.01)
(52) U.S. Cl. .................................. 701/213; 342/357.09
(58) Field of Classification Search ................. 701/213; 342/357.04, 357.08, 357.09, 357.12–357.17
See application file for complete search history.

(56) References Cited

U.S. PATENT DOCUMENTS 5,323,322 A    6/1994  Mueller et al.

(Continued)

OTHER PUBLICATIONS

International Search Report dated Aug. 23, 2004 regarding (PCT/GB2004/001676).
Article entitled "Mitigating Tropospheric Propagation Delay Errors in Precise Airborne GPS Navigation" by J.P. Collins and R.B. Langley, which was presented at the IEEE Position, Location and Navigation Symposium, Atlanta, Georgia, USA, Apr. 22-26, 1996 (8 pages).

*Primary Examiner*—Dalena Tran
(74) *Attorney, Agent, or Firm*—Rader, Fishman & Grauer PLLC

(57) ABSTRACT

A method of obtaining data for use by a receiver of a satellite positioning system or a GNSS comprises deriving the data remotely from the receiver by a server (200), using meteorological information and a regional or global three dimensional map of grid points from which it computes tropospherical delays by ray tracing through the refractivity field derived from atmospheric measurements of pressure, temperature and water data content, such measurements being available from meteorological bodies. When used to enhance position determined by a user receiver that includes a non-meteorological, climate based model (130) giving zenith delays and means (130') to map them to particular inclinations, the server also includes a copy of such non-meteorological model (230) and provides its ray traced delay values as zenith delays. The sets of zenith delay values for corresponding grid points are compared in the server (260) and modifications developed (preferably in fractional form) by which the non-meteorological delay values require correcting to be accurate. The correction sets are reduced by image compression techniques (270) and transmitted via the satellites (110₁ etc) of the GNSS at low data rate to the user receiver, which receiver simply applies the corrections to the Zenith delays derived by its own model. If a user position is known, the server may derive accurate tropospheric delay values directly for the receiver position directly for transmission.

60 Claims, 7 Drawing Sheets

U.S. PATENT DOCUMENTS 5,828,336 A * 10/1998 Yunck et al. ........... 342/357.02
2001/0026239 A1   10/2001 Fenton
2002/0199196 A1   12/2002 Rabinowitz et al.
2005/0001742 A1 *  1/2005 Small ..................... 340/988

* cited by examiner

CORRECTION OF TROPOSPHERE INDUCED ERRORS IN GLOBAL POSITIONING SYSTEMS

FIELD OF THE INVENTION

The present invention relates to developments intended to increase the accuracy obtainable from global navigation satellite systems (GNSS).

BACKGROUND OF THE INVENTION

At present there are two publicly available GPS systems, known as NAVSTAR, owned by the USA, and GLONASS owned by the Russian Federation. These have been in existence for around two decades, but in the near future it is hoped that the European regional augmentation of GPS will start to provide its services, followed within a few years by a European system under the name of GALILEO.

The existing systems have been progressively refined so that using a differential phase implementation a locational accuracy of less than 2 cm can potentially be achieved over a baseline of 1000 km, but with a cost in computation and in the time taken to determine the location. Real time or near real time measurements have a correspondingly lower resolution, and at present the requirements for high precision mean that additional augmentations are necessarily employed to supplement the GNSS information. Furthermore, these could include a receiver taking measurements from many satellites, up to all those visible to it whereby to calculate an over-determined position solution and rejecting inconsistent data to improve the accuracy of the position solution. Such a system may use data from more than one constellation of GNSS satellites, GPS and GLONASS.

Although GNSS is used mainly for establishing the location of a user having a suitable, usually mobile, receiver, it is also used in respect of providing accurate time signals to users whose locations are already known or do not need to know. Single user position determining sets have simple receivers of satellite transmissions and circuitry that effects modelling of at least some atmospheric effects that influence signal reception so as to go some way towards eliminating errors in calculated position.

However, whether the user is interested in obtaining a position or a time measurement, a significant error arises from the inability to model accurately the delay to the GNSS signals caused by the atmosphere, namely the ionosphere and troposphere.

Satellite navigation users generate their three-dimensional position and time solution by processing four 4 or more pseudorange measurement to four or more satellites. A pseudorange measurement is the difference between the satellite clock time at signal broadcast and user receiver clock time at reception. The pseudorange observation is therefore related to the radio propagation time and therefore range between satellite and user. As estimates of the satellite position are known (they are broadcast by the satellite) a user can solve for the four unknowns (three-dimensional position and time) using four or more pseudorange observations. As part of the user's navigation/time solution filter pseudorange observations are corrected for variations in radio propagation time from that of free-space propagation.

In the user's navigation/time solution filter, a number of corrections are applied to the raw pseudorange measurement including tropospheric, ionospheric and relativistic corrections.

It has been suggested in WO-A1-03/069366 how to accommodate ionospheric delays and by use of a so-called server site which receives GNSS satellite signals, derives correction factors applicable to GPS receivers in the vicinity before broadcasting them locally so as to be received by such a GPS receiver and used to modify the on-board model used to correct such delays. For ionospheric delays, which comprise a small degree of signal path refraction and a more significant change in signal velocity, the delays and corrections therefor are substantially constant over a period of time that requires updating of correction data at most a few times per day.

Tropospheric effects on the other hand are relatively fast changing (or short-lived) and geographically localised, resulting primarily from weather or meteorological phenomena rather than climatic phenomena. However, the troposphere constitutes one of the largest identified sources of error in the effect that it has on signals propagating therethrough. The troposphere introduces ray bending and therefore an increase in signal path that constitutes a signal delay which is influenced by a number of meteorological factors, but particularly water content. Tropospheric delays are difficult to model simply.

Traditionally, tropospheric delay has been handled by the use of global tropospheric delay models that work from so-called climate parameters that relatively invariant and can be stored in the user receiver, but these parameters at best constitute an average or seasonal expectation, but not one that is meteorologically based, that is, based upon current, recent or predicted weather conditions.

One such model that is used and may be built into a portable GPS receiver is the RTCA tropospheric zenith delay model for WAAS users described in "Minimum Operational Performance Standards for Global Positioning Systems/Wide Area Augmentation System Airborne Equipment" RTCA DO229C, November 2001.

Such model is useful insofar as it simplifies tropospheric delays to zenith values (identified herein as $D^z$ or ZTD) but there is still the need to map these for elevation effects caused by low satellite inclinations to the user. One such mapping model is described by Niell in "Global mapping functions for the atmosphere delay at radio wavelengths" Journal of Geophysical Research Vol 101, No B2, Pages 3227-3246, February 1996.

However, although these models permit incorporation into a user receiver they are inherently limited in ability to accommodate changes in tropospheric conditions that affect signal delays caused by the constantly changing, and localised weather.

Although models exist for deriving accurate tropospheric data by taking into account the meteorological conditions in one or more regions, such as by numerical weather prediction (NWP), the localised nature and thus large amount of data generated has been perceived as confirming that presently they cannot be used to sensibly improve upon practicable devices; that is, due both to this data being too large to be sent over communication systems that are available to mobile users and the limited capacity for processing within a reasonable amount of time.

The present invention provides a method of obtaining tropospheric delay data for use in a satellite positioning system or GNSS comprising the steps of generating for a user location, at a location remote from the user location and from meteorological information, at least one accurate tropospheric delay value, applicable to the user location for communication as a tropospheric delay correction to a said user.

Preferably said accurate tropospheric delay values are derived by a ray tracing technique. The accurate tropospheric delay values may be derived by three-dimensional refractive index field generation. Furthermore, it is also preferred that said meteorological information is based on numerical weather prediction (NWP) data. The meteorological model or each said tropospheric delay value correction derived therefor may be augmented by directly observed meteorological data.

In an embodiment of the invention, applicable to a user whose position is not accurately known, the method may comprise generating, from a first model which is known per se, a first set of approximate tropospheric delay values applicable to various user geographical locations, generating from a meteorological model employing such meteorological information a second set of tropospheric delay values that are accurate and applicable to said various user geographical locations, developing a set of delay value modifications for use with said first model so that it can provide a set of tropospheric delay values substantially in agreement with the second set, and expressing the set of modifications as a set of tropospheric delay corrections for communication to a said user.

The first model is based on non-meteorological parameters, which parameters comprise at least one of time of year, latitude and altitude. The non-meteorological parameters may further comprise at least one of longitude and time of day.

In the method of this embodiment the first and meteorological models develop sets of tropospheric delay values comprising zenith tropospheric delays. The first model may contain a mapping function relating tropospheric delay at a given elevation angle to the zenith tropospheric delay, and said set of delay value modifications may comprise a set of modifications for use with the mapping function of the first model.

Preferably, the modifications to the delay values are the differences between corresponding values of the sets attributable to the first and meteorological models. The corrections to be communicated may be the modifications per se or, preferably, the modifications expressed as a fractional change from the values of the first set, for example as a percentage.

Thus a correction may be effected as an addition or multiplier to any value generated by use of the first model.

The accurate tropospheric delay values are derived by a ray tracing technique, to determine the path of the satellite signals through the troposphere to the user and hence estimate the delay from a direct path, and possibly employing three-dimensional refractive index field generation.

It is possible to effect comparable corrections to mapping functions in such a first model that also rely upon paths affected by tropospheric delay.

The meteorological model may be based on numerical weather prediction (NWP) data for a region of the earth or real time meteorological data or both. In particular, the meteorological model or each said tropospheric delay value correction may be augmented by directly observed meteorological data, such as available in two-dimensional form from some imaging satellites.

The region for which data values are obtained may be substantially global or may be a smaller region as defined in NWP schemes as mesoscale maps.

In both cases it is possible to generate a set of (zenith) tropospheric delay values for each of a grid of locations over a region, as a two-dimensional array defining the geographical points at each of which is a delay value. Thus it is possible to create from the meteorological model and non-meteorological model zenith tropospheric delay value modifications and a set of corrections as a data array having values determined for individual grid points on the earth's surface, and the set of values comprises a distribution of said modifications over at least part of the earth's surface.

Having regard to the nature of the delay values and corrections, data reduction may be applied to the correction set, deriving a reduced data set for communication to a user.

Preferably, insofar as the nature of the correction set produces a data file analogous to that of a greyscale image reduction of the data size of the correction set is accomplished by an image compression process, conveniently, but not essentially, by lossy data reduction such as according to a wavelet-based JPEG 2000 or cosine JPEG standard.

By effecting a suitable level of data reduction, it becomes possible to communicate the correction set data to a user over a communication or data channel of limited bandwidth.

Thus having created a correction set suitable for use by a remote user having a satellite signal receiver, in accordance with this embodiment of the invention at least part of the correction set may be communicated via at least one orbiting satellite by transmitting the correction set as a reduced data image file to a said satellite and re-transmitting at least part of the set to a user from a said orbiting satellite.

Preferably this is achieved by communicating the corrections to at least one orbiting GNSS satellite from which user receives signals to establish at least one of position and time.

In order to reduce even further the amount of data to be transmitted or re-transmitted, the method envisages communicating the image data to a said satellite for re-transmission of only that part of the correction data that can be of use to a user in a region within range of said satellite. This may be achieved by transmitting only said part of the correction data to the satellite or transmitting all of the data but causing the satellite to re-transmit only said part.

Insofar as such a satellite has limited capacity to transmit signals additional to those already transmitted and is in general only able to transmit any data, including correction data, periodically, it must be borne in mind that the meteorological environment is changing continuously as weather features vary their position in relation to the mapped region. Thus in addition to deriving tropospheric delay values associated with grid points of the mapped region it is necessary to apply data reduction sufficient to permit transmission of all or part of a said corrections useable by a user within a time, dictated by transmission availability and transmission rate of the satellite, substantially lower than the validity time of the meteorological information used by the meteorological model.

To ensure the validity of the tropospherically derived data, it is preferred to transmit said delay value corrections to a user corresponding to a meteorological temporal resolution of said meteorological model information of no greater than 1 hour, and/or corresponding to a meteorological spatial resolution of said meteorological model information of no greater than 90 km, insofar as time and distance are linked by speed of movement of relevant weather features.

By the above outlined image compression technique it is possible to effect correction data transmission to a user at a data rate in the range 25 to 500 bits/s and by selectively transmitting only parts of a global image applicable to a user in a relatively small region thereof, to permit correction data transmission effectively at rates well below the top of the range.

Insofar as the meteorological model derives a tropospheric delay values from data employed elsewhere to forecast or predict weather conditions at one or more locations, that is, conditions which vary with time, it is possible to predict tropospheric delay values in the future from said meteorological information and develop a prediction set of said corrections for a geographic region of the earth's surface, whereby each member of said prediction set describes a correction that becomes current as a function of time from development. It is therefore possible to communicate said prediction set of corrections as a batch and use members of the set as the time for which each was predicted becomes current in respect of the forecast.

Such communication may be to an orbiting satellite and the members re-transmitted one at a time as the time for which each was predicted becomes current in respect of the forecast.

A second embodiment employing the method is applicable when the position of the user receiver with respect to the server and/or GNSS satellites is known. That information may be employed by the server with the meteorological information to derive actual or mapped tropospheric delay values (rather than zenith delay values) for communication to the user for the purpose of setting or correcting the user receiver pseudoranging and obtaining accurate timing values. Such communication may be direct or via a network. It may also take place via one or more satellites, such as the GNSS satellites as discussed above, although data reduction may be required. Insofar as the users location is known, it is not expected to be necessary to derive and communicate a set of delay value corrections representing a distribution over a region. However, as discussed above, it may be appropriate to forecast weather conditions for any user location the user may be in and derive a predicted set of delay corrections and communicate these in batch form for use by the user receiver in turn as the time for which each member was predicted becomes current.

According to a second aspect of the present invention there is provided apparatus for obtaining data for use by a user of a satellite positioning system or GNSS, comprising generating means for generating, at a server location remote from the user from meteorological information, at least one accurate tropospheric delay value applicable to the user location and means to communicate at least a function of a said value to the user as a tropospheric delay correction.

The server may be arranged to derive a set of tropospheric delay values applicable to a plurality of user locations.

In a first embodiment, the apparatus of the preceding paragraph comprises first generating means for generating a first set of approximate tropospheric delay values from a first model which is known per se, second generating means for generating a second set of more accurate tropospheric delay values from a said meteorological model based on meteorological information, and developing means for developing from said first and second delay sets a set of tropospheric delay value modifications for use with said first model so that it can provide a set of tropospheric delay values substantially in agreement with the second set, and said developing means being arranged to express the modifications as a set of tropospheric delay corrections.

Preferably said first generating means utilises a said first model is based on non-meteorological parameters. Also, the developing means may be arranged to express said set of corrections each as a difference between corresponding values of the first and second sets, possibly as a fractional change from the values to be corrected.

The developing means is arranged to express the corrections as a distribution over a region of the earth's surface, preferably in the form of a data file corresponding to a greyscale image of multi-bit words, each word representing a location of the region. Furthermore the apparatus may include means for compressing said set of corrections. This may effect lossless compression of the set or for greater reduction, lossy compression on the set.

Each of the first and second generating means may advantageously derive corrections for parameters of at least an elevation mapping function used to map the zenith delay values to actual delay values. Corrections may be superimposed on the zenith delay correction data set as longer words for communication to the receiver The apparatus also transmission means for transmitting said set of corrections to a user, and preferably to transmit via an orbiting satellite, which may be a satellite of the GNSS.

In a second embodiment, applicable to apparatus in which the position of a user receiver of satellite signals is known, apparatus is arranged to receive from the user information defining at least one of the user location with respect to the server or with respect to the GNSS satellites and to provide corrections in the form of tropospheric delay values per se rather than zenith delay values, although the latter could be provided.

According to a third aspect of the invention a GNSS user receiver comprises means operable to generate from an on-board model from non-meteorological data a set of approximate tropospheric delay values applicable to identification signals received from a plurality of said satellites and from and delay values and identification signals received from a plurality of said satellites compute an approximate position of the receiver relative to the earth's surface or time, means operable to receive a set of corrections to said tropospheric delay values derivable from the model, said corrections being derived from meteorological data, means to effect modifications to said derived delay values in accordance with the corrections and means to compute the position or time with greater accuracy.

Said means to effect modification to said delay values may be operable to effect interpolation or extrapolation of said corrections according to computed position of the user relative to locations for which the corrections have been derived According to a fourth aspect of the invention a GNSS including a plurality of orbiting satellites, apparatus as defined above for obtaining data and a user receiver.

In the above discussion, tropospheric delay values and zenith tropospheric delay values have been referred to without regard to their nature. Whereas it is possible to derive a single troposphere delay value for a particular position, it is more usual to derive it as a so-called "wet" delay and a "dry" or "hydrostatic" delay. Apart from circumstances where it is important to distinguish, in particular in respect of data reduction, in this specification, references to tropospheric delay or delays and their derivation is intended to be read as deriving values for each.

BRIEF DESCRIPTION OF THE DRAWINGS

Further details and advantages of the invention will be evident from the following description with reference to the following drawings, in which.

DETAILED DESCRIPTION

Figure 1:
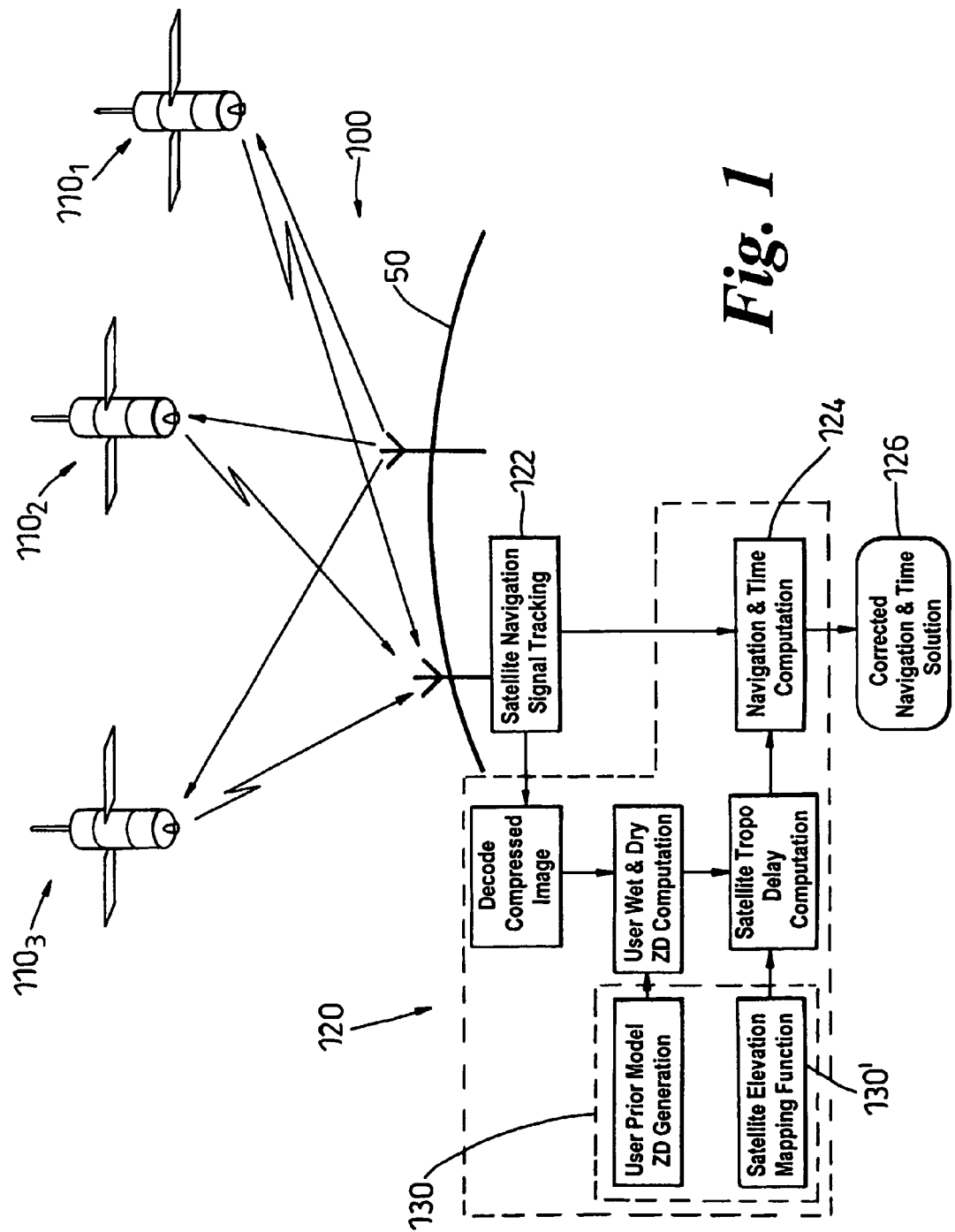
FIG. 1 is a schematic representation of a GNSS positioning system known from the art, illustrating a user positioning receiver device and a plurality of orbiting positioning satellites.

Referring to FIG. 1 this represents in schematic form a section of the earths surface 50 and in relation thereto a global positioning system 100 comprising a plurality of GNSS satellites $110_1, 110_2, 110_3, \ldots$ in earth orbit and a user 120, in the form of a signal receiver and processor of hand-held or vehicle-mounted type at or above the earth's surface.

The user receiver 120 comprises, in conventional manner, a front end receiver 122 of signals transmitted from the various satellites within view at radio frequency frequencies, processing means 124 and information display or like delivery apparatus 126. The processing means includes a digital processor that responds to received signals from, and characteristic of, the various satellites whose orbital positions are known with respect to points on the earth and computes from the variations in reception of these signals a solution comprising the position of the user receiver in two- or three-dimensions, and, importantly in some applications, time.

The user receiver can determine from the plurality of received satellite signals via the above outlined pseudorange measurements an approximate position, but compromised by delays inflicted upon the signals by refraction in the troposphere caused by refraction, principally the water content of meteorological systems such as weather fronts. Such tropospheric refraction may be compensated for by, at least to a first approximation, by applying to processing of the received signals a first model 130 that represents climatic conditions anticipated for that approximate location at the time of year. This so-called climate model is essentially non-meteorological, insofar as it is updated infrequently and represents at best a representation of average conditions. In known manner the climate model 130 holds parameters for at least one, and preferably all of time of year, latitude and altitude as pertain to the position of the user and may optionally hold parameters of longitude and/or time of day.

The climate model is arranged to generate zenith tropospheric delays (ZD) that may be applicable to the users location that may be mapped in respect of satellite elevation inclination with respect to the receiver to give a more accurate value of tropospheric delay and effect pseudorange corrections having regard to the direction actually taken by the received signal path, particularly if the satellite is at low elevation.

To this end, the first model may include an elevation mapping function 130' employing, for example as a three-term continued fraction approximation, substantially as set out by Niell in the paper mentioned above. However, it should also be understood that the parameters used in the mapping model, being derived from the time of year, latitude and altitude parameters mentioned above, are also subject to errors caused by meteorological disturbances, although for many purposes these errors may be considered too small to correct.

This prior art apparatus utilises the zenith tropospheric delay, and if appropriate mapping function, to effect an approximate correction to the tropospheric delays enabling the receiver to compute a more accurate solution for position and time.

Notwithstanding its inherent inaccuracies, this first model is valuable insofar as it permits a user receiver to be manufactured and used with this (albeit limited) correction facility built in and not dependant upon receiving signals from elsewhere.

Hitherto, the positioning accuracy of a user receiver has been compromised by a number of factors but as these resolve, and error sources reduce, it is apparent that residual tropospheric delay errors that remain after using the first model are now an important cause of limitation to accuracy.

Figure 2:
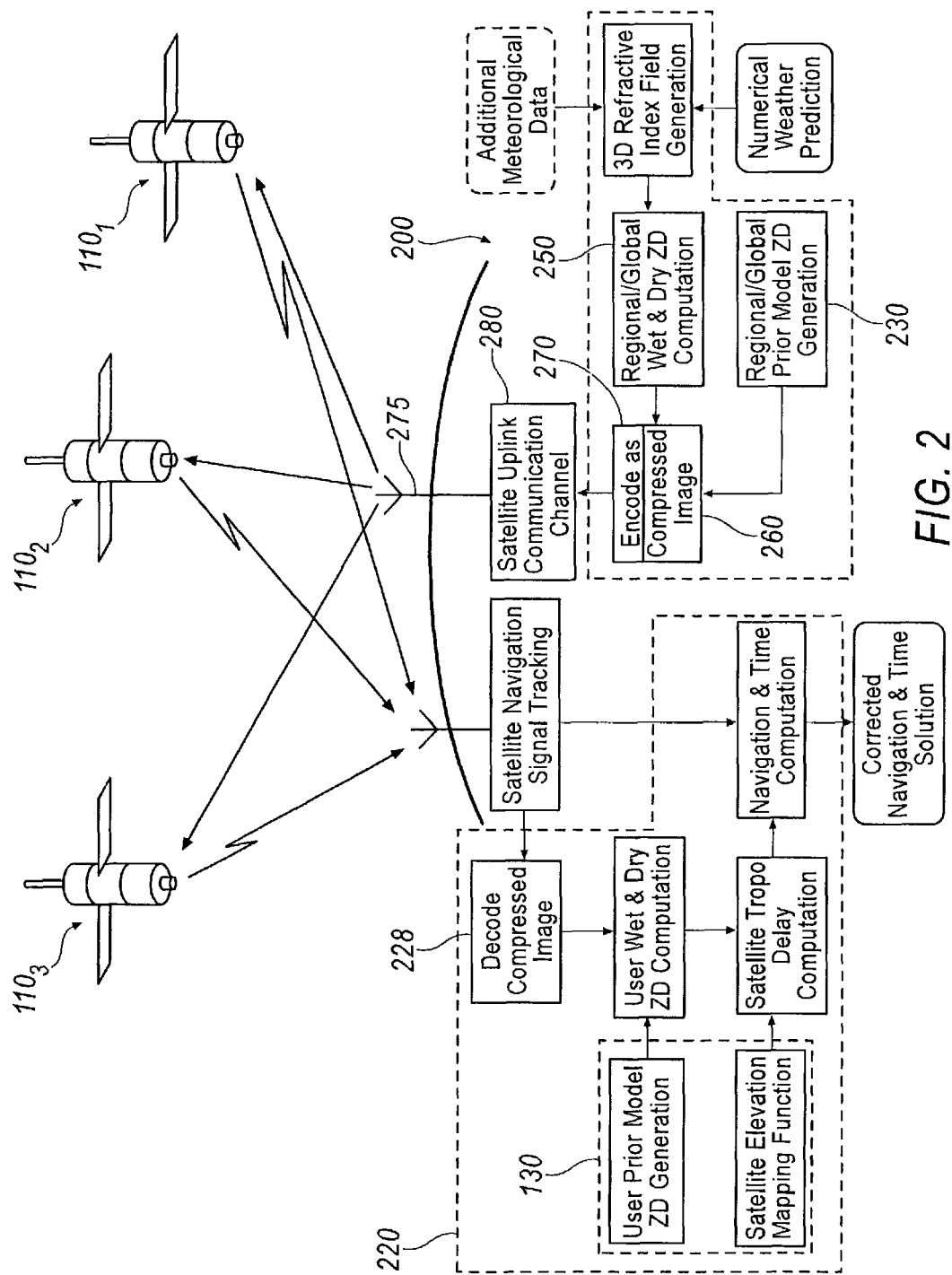
FIG. 2 is a schematic representation of a first embodiment of GNSS positioning system embodying the present invention, illustrating a user positioning receiver device, a ground station and a plurality of orbiting positioning satellites.

Referring now to FIG. 2, in accordance with the present invention there is provided at an earth location a ground station 200, conveniently referred to herein as a server, although there may be more than one associated with different regions of the earth's surface. This server has no means for receiving satellite signals but is coupled to receive from one or more meteorological organisations information representing the results of, or suitable for, numerical weather prediction (NWP) for locations at various positions around the earth; the meteorological information may be global in nature or confined to one or more sub-global regions.

There is provided in the server, and indicated at 230, a duplicate of the first model (130) as used in the user receiver, which contains the aforementioned non-meteorological, climate modelling parameters.

There is also provided in the server a meteorological model indicated generally at 250. This model responds to meteorological information provided by the NWP and determines accurate values for ZD (as wet and dry components).

The zenith tropospheric delay ZD values for the two models are compared at 260 in order to determine differences between them that constitutes an error attributable to the first model. The differences thus constitute modification values by which the product of the first model might be modified or corrected in order to provide the same result as the second model.

These corrections are encoded and subjected to data reduction at 270, as described in detail below, and then communicated to the user receiver by way of a communication channel 280 that constitutes an uplink to one or more of the GNSS satellites $110_1$ etc by way of transmitter 275 and re-transmission from the satellite or satellites to the user receiver, indicated generally at 220.

The user receiver includes a decoder 228 of the correction values data that thus provides ZD values for the first model (wet and dry values) effectively making them that same as if derived accurately by the second model present only in the remote server, for use in the navigation and time computing.

Optionally, as also described below, the corrections may include items applicable to mapping functions of the first model so that both zenith delay and mapping function values are given a greater accuracy for the position and time computation.

The above overview of the system is expanded below with discussion of further features that can be employed individually but which when used together interrelate advantageously.

Referring to the server 200, the meteorological model relies upon a three-dimensional array of grid points for which meteorological information is available and uses such information to derive a refractivity field that permits ray tracing between a ground point near the earth's surface and a particular satellite, as a result of which a tropospheric delay value (for each of the wet and dry delays) can be found.

At this point it is appropriate to give some background on propagation and atmospheric refractivity and atmospheric effects as they relate to ray-tracing and NWP.

Figure 3A:
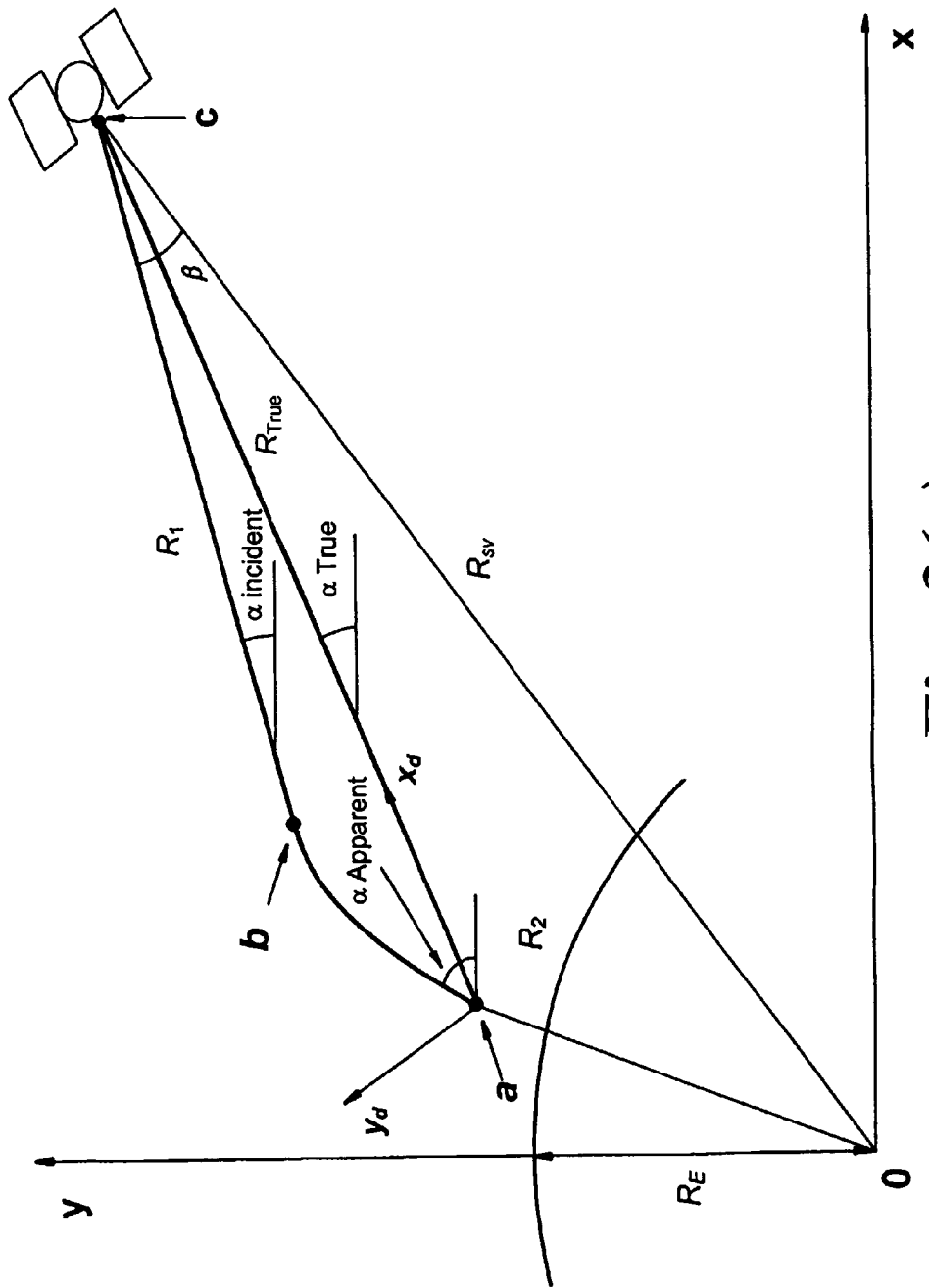
FIG. 3(a) is a graphical illustration of ray-tracing.

The speed of propagation of an electromagnetic wave through a medium can be expressed in terms of the refractive index, n, defined to be the ratio of the speed of light through free-space to the speed through the medium (Equation 1-1).

$$n = \frac{c}{v} \quad (1\text{-}1)$$

where:
n is the refractive index
c is the speed of light in free space
v is the propagation velocity In practice, and as illustrated in FIG. 3(a), the path is curved by refraction as it passes between the satellite and earth, most of this delay. The GNSS tropospheric time delay, ignoring relativistic effects, is defined to be the propagation time of the GNSS signal from the satellite to the user minus the free space propagation time:

$$d_{trop} = \int_{User}^{SV} n(s)\,ds - \int_{User}^{SV} ds \quad (1\text{-}2)$$

where:
s is the distance along the propagation path.
The first integral is along the curved propagation path; the second integral is along a geometric straight path.

The differential equation describing the curved ray path can be expressed, in cartesian coordinates, as:

$$\frac{d}{ds}\left(n\frac{dr}{ds}\right) = \nabla n \quad (1\text{-}3)$$

where r=r(s) is the vector describing the ray path,
s is the length of the curved ray path up to r,
n is the refractive index scalar field,
$\nabla n$, a vector field, is the gradient of n.

The differential equation can be expanded as $$\frac{d^2 r}{ds^2} = \frac{1}{n}\left(\nabla n - \left(\nabla n \cdot \frac{dr}{ds}\right)\frac{dr}{ds}\right). \quad (1\text{-}4)$$

A first order ordinary differential equation (ODE) with known initial values can be solved using numerical methods: for example Runge-Kutta or Adams-Moulton methods. Higher order differential equations can be solved numerically by rewriting them as an equivalent system of first order equations. Using the substitution $r_1=r$ and $r_2=r'$ (the first derivative), the ray path differential equation (1-4) can be expressed as an equivalent system of two first order differential equations 1-5 and 1-6:

$$r'_1 = \frac{dr}{ds} = r_2 \quad (1\text{-}5)$$

$$r'_2 = \frac{d^2 r}{ds^2} = \frac{1}{n}(\nabla n - (\nabla n \cdot r'_1)r'_1) \quad (1\text{-}6)$$

The determination of the ray path therefore amounts to the solution of a system of two ODEs with initial values. Standard numerical methods can be used to solve the problem: for example, a Runge-Kutta method with adaptive step control consistent with user defined tolerances.

With the ray path solved, the tropospheric delay can be computed as:

$$d_{trop} = \int_a^b n(s)\,ds + \int_b^c ds - \int_a^c ds \quad (1\text{-}1)$$

where a, b and c are as shown in FIG. 3(a). Point b corresponds to the point at which ray curvature and refractivity can be assumed to be negligible, in this specification above an altitude of 70 km.

The ray-tracing process to determine the path from user to satellite (a to b in FIG. 3(a)) starts at point a and assumes a starting elevation angle of $\alpha_{Apparent}$. Although the precise satellite position and therefore $\alpha_{True}$ is known, $\alpha_{Apparent}$ (such that the ray path intersects point c) can initially only be estimated. Because ray tracing starts off at an angle that is at best a guess, the resultant ray path will in general not intersect point c. By deriving at least two ray traces and using interpolation or iterative methods it is possible to establish an angle of suitable accuracy from which tropospheric delay is derived. The present invention is predicated upon deriving for use a more accurate value for each tropospheric delay.

At least part of tropospheric delay determination is based upon Numerical Weather Prediction (NWP) modelling which forecasts the evolution of atmospheric physical processes by applying governing equations, including the conservation of mass, momentum and energy. Three-dimensional fields of continuous variables including humidity, pressure, temperature and velocity are numerically processed and meteorological features, including weather fronts, are secondary derived properties. A variety of measurements can be input into the numerical model including surface, radiosonde and satellite observations. The water cycle is modelled including the effects of terrain moisture, sea surface temperature, cloud formation and precipitation.

Numerical models can be global or of limited area. Limited area high-resolution models are often termed mesoscale models as they reflect mesoscale meteorological features, weather patterns of less than 100 km in size.

The UK Meteorological Office has and makes available so-called Unified Models of mesoscale and global data. The NWP model maps each define a grid over the map's coverage region and the models provide tropospheric delays at corresponding points. For example, the UKMO has two NWP models, the so-called global model and the mesoscale model. The former has a horizontal resolution of 0.8333 degrees (⅚ degrees) in longitude and 0.5555 degrees (5/9 degrees) in latitude giving a grid of 432×325 points defining the earths surface, each point associated with a cell of about 60 km at mid latitudes and about 90 km in the tropics. This global map may be used inter alia to provide boundary points for a mesoscale model which is a regional model centred on the British Isles and has a resolution of 0.11 degrees in longitude and latitude (the grid being rotated with a shiftied pole to maintain uniform horizontal resolution) and has 146×182 grid points which correspond to an array of cells of approximately 12 km×12 km. Both models have 38 vertical levels and extend to about 40 km.

At any grid point of the relevant map The atmospheric refractive index (and therefore the gradient of the refractive index) can be derived from numerical weather prediction model pressure, water vapour partial pressure and temperature fields. Atmospheric refractivity can be divided into dry (hydrostatic) and wet components. A simple two-term expression having a refractivity accuracy of 0.5% is:

$$N = N_{dry} + N_{wet} = \frac{77.6}{T}\left(P + 4810\frac{e}{T}\right) \quad (1\text{-}8)$$

$$N = 10^6(n-1) \quad (1\text{-}9)$$

where:
N is the refractivity.
n is the refractive index
P is atmospheric pressure (millibar)
e is the water vapour pressure (millibar)
T is temperature (Kelvin)

The numerical weather prediction fields to be used are expressed in a spherical coordinate frame, it is computationally convenient, therefore, to generate the refractivity gradient in spherical coordinates (r,θ,α), which can be converted into local curveilinear coordinates (u,v,w) using the following transformation.

$$[\nabla n]_{uvw} = \frac{\partial n}{\partial r}u + \frac{1}{r\sin\alpha}\frac{\partial n}{\partial \theta}v + \frac{1}{r}\frac{\partial n}{\partial \alpha}w \quad (1\text{-}10)$$

Figure 3B:
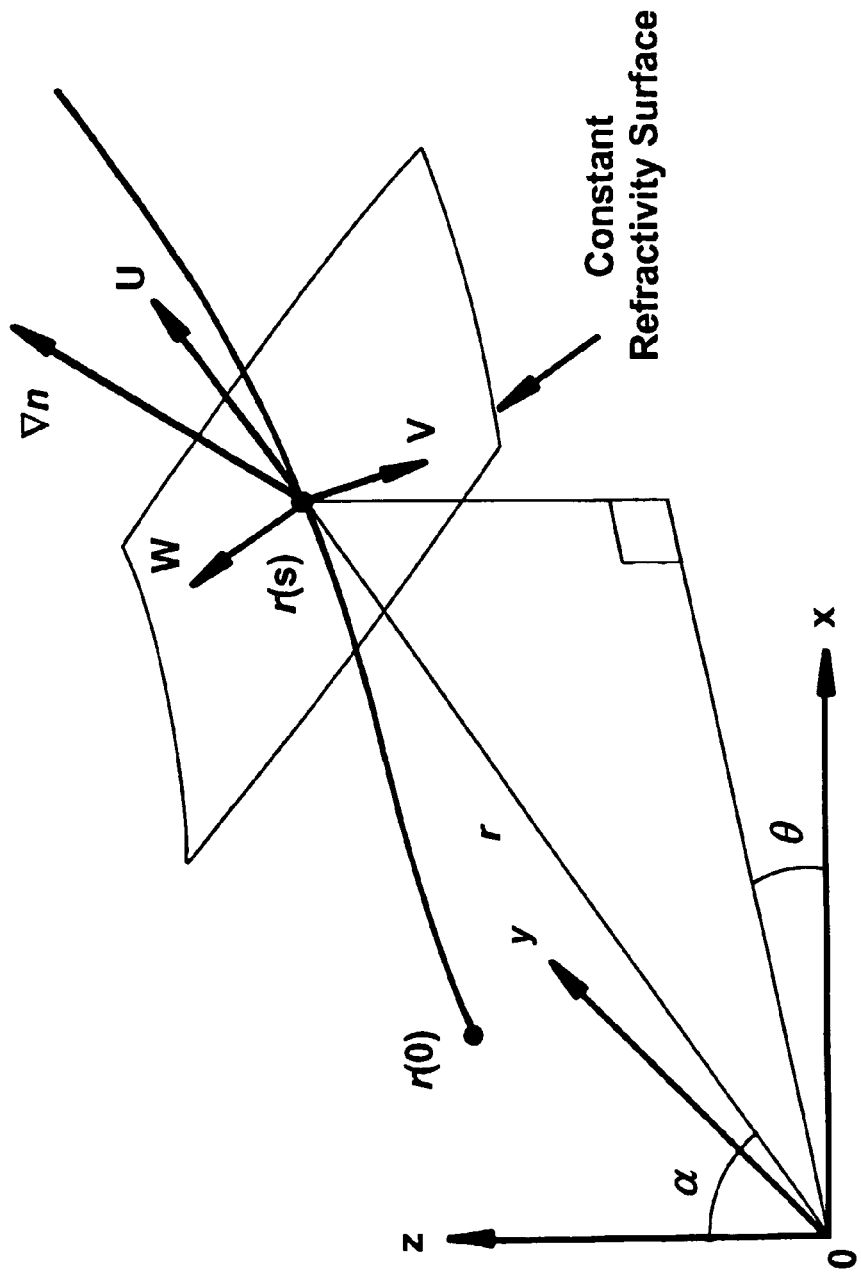
FIG. 3(b) is graphical illustration of mapping a refractivity field in ray tracing.

A further rotational transformation is then applied to the local curveiliner coordinate frame to give the gradient in a fixed cartesian frame (x,y,z in FIG. 3(b)) suitable for numerically solving equations 1-5 and 1-6.

NWP field values between grid-points can be linearly and log-linearly interpolated. Linear and log-linear extrapolation techniques can be used to extend the NWP fields beyond the highest grid-point and below the NWP terrain. For an accurate construction of the refractive index field, account must be taken of the variation of gravitational acceleration with height and latitude. Hydrostatic equilibrium can be assumed. With the three-dimensional refractive index field (n) defined, the ray path equations can be solved and the tropospheric delay computed using Equation 1-2.

The atmospheric refractive index can be divided into dry (hydrostatic) and wet components. The wet component possesses the larger spatial and temporal variability. It is often convenient to divide total zenith delays into wet and dry zenith delays. The hydrostatic zenith delay can be accurately modelled given a surface pressure measurement, however the wet zenith delay can not be accurately determined from surface humidity measurements, as they are not representative of the above atmosphere.

In order to aid understanding reference is made briefly to discussing the presentation of tropospheric delays as so-called "wet" and "dry" components and elevation mapping as applied thereto.

In modelling tropospheric delay, it is convenient in accordance with the first model, to relate the tropospheric delay at a given elevation angle, ϵ, to the zenith delay ($d_{Trop}^z$) by means of a mapping function (m(ϵ)).

$$d_{Trop} = d_{Trop}^z m(\epsilon)$$

The hydrostatic zenith delay can be accurately modelled given a surface pressure measurement but the wet zenith delay can not be accurately determined from surface humidity measurements, as they are not representative of the above atmosphere. The expression for the tropospheric delay at a given elevation angle can be defined as:

$$d_{Trop} = d_{hyd}^z m_{hyd}(\epsilon) + d_{wet}^z m_{wet}(\epsilon)$$

It is noted that care must taken when applying the simplification of the superposition of hydrostatic and wet atmospheric delays: the propagation path is dependent upon both hydrostatic and wet components.

Hydrostatic and wet mapping functions according to the Niell methodology possess a high degree of accuracy without the need for prior meteorological information, and the variation of tropospheric delay with elevation angle can be efficiently modelled by a continued fraction expansion.

Meteorological features that possess a large spatial and/or temporal variation in tropospheric delay will impact the accuracy of NWP-derived tropospheric corrections and the bandwidth required for dissemination on a regional or global basis. The temporal and spatial variation in hydrostatic refractivity is generally small, whereas meteorological features associated with rapid changes in atmospheric moisture significantly impact the accuracy/bandwidth relationship.

Meteorological features smaller than the resolution of the numerical prediction model will not be accurately reflected in the NWP-derived tropospheric correction.

A weather front marks the interface between air masses: defined as a large body of air whose physical properties are largely uniform horizontally for hundreds of kilometres. The front can mark the occurrence of abrupt changes in atmospheric moisture, temperature and therefore refractivity. Fronts can be divided into three classifications: warm, cold and occluded.

The most rapid change in tropospheric delay is likely to occur when satellite elevation and front inclination are equal. Generally, in the UK, frontal systems move at 30 to 50 kilometres per hour and can result in zenith delay variations of 3 cm/hour. Tropospheric delays vary in accordance with inclination to earth insofar as they are ray-tracing is taking place through meteorological features that vary differently with both altitude and position.

The server 200 thus takes as input regional or global numerical weather prediction model information including pressure, temperature and humidity data and computes the three-dimensional refractive index field from the meteorological data. Wet and dry tropospheric delays are derived for a gridded area, corresponding to the NWP coverage, at heights corresponding to a terrain database (that may be the NWP terrain). These are transformed to, or initially computed as zenith delays For the same grid locations including height, wet and dry zenith delays are computed from the first model 210.

The server, in computing the the difference between first model and meteorological model, and thus the modifications required to the first model zenith delays to makethewm accurate, derives these diferences each as a fractional change from the first model value, as a percentage.

There are two benfits to this. Firstly it is found that notwithstanding the actual values of the delays and the differences, the differences lie in a small range (approximately ±10%) from the corresponding first model values; this permits developing a smaller range of correction values to transmit than if actual value differences were used. Secondly, it provides for better correction of first model zenith delay values by interpolation.

A correction, $BC_{\%}$, defined as a percentage correction to the first model that includes the variation of zenith delay with height is transmitted. The corrections are in the form of a gridded data set. The user can linearly interpolate their tropospheric correction from the adjacent set points.

$$BC_\%(\phi, \lambda, h_0) = 100 \cdot \frac{ZD_{nwp}^{h_0} - ZD_{prior}^{h_0}}{ZD_{prior}^{h_0}}$$

where, $ZD_{nwp}^{h_0}$ is the zenith delay, measured from height $h_0$, computed from the numerical weather prediction, $ZD_{prior}^{h_0}$ is the zenith delay, estimated from height $h_0$ computed using the a priori atmospheric model, $h_0$ is the height above mean sea level at which the broadcast correction percentage is computed, $\phi$ is the latitude at which the broadcast correction percentage is computed, $\lambda$ is the longitude at which the broadcast correction percentage is computed.

The user can compute the zenith delay as:

$$ZD_{User}^{h_1} = ZD_{prior}^{h_1}(1 + BC_{int\%}/100)$$

where, $BC_{int\%}$ is the interpolated correction percentage, $h_1$ is the user height.

It should be noted that this technique avoids requiring the user receiver to store the NWP terrain data set, which, as the NWP model evolves, is likely to change. If the user is located at one of the grid-points corresponding to the broadcast corrections and at $h_1=h_0$, the user applied tropospheric correction is equal to $ZD_{nwp}^{h_0}$ It will be appreciated that particularly for communicating by satellite and more particularly by GNSS satellites there is a limit on transmission bandwidth. Although improvements may in the future ease this restriction, for the present it is necessary to plan to transmit data at less than 500 bit/s and typically 200 to 250 bits/s. This is exacerbated by the satellites not being available to transmit at all times, but only within certain transmission windows. To this end, it is appropriate that the correction data derived from the models is suitable for data reduction.

The NWP model maps each define a grid over the map's coverage region and the models provide zenith delays at corresponding points, and thus a set of differences (modifications or corrections) is defined corresponding to said geographical points. Thus for a particular set of meteorological information at a particular time, the server can compile a matrix array of such zenith delay modifications for the various locations of the organisation's map coverage.

For example, as mentioned above, the UKMO has two NWP models, the so-called global model and the mesoscale model. The former has a resolution giving a grid of 432× 325points defining the earths surface, and the mesoscale model which is a regional model centred on the British Isles has 146×182 grid points.

Thus there exists a two-dimensional matrix array of point correction sets each represented by a multi-bit word. In particular this can as in this embodiment be represented by an 8-bit word.

Figure 4:
FIG. 4 is a pictorial representation of a zenith delay data file, suitable for data compression by image compression techniques.

Thus there exists in the base station, and based upon the particular UM of interest a geographical distribution of corrections, essentially an 8-bit greyscale map image of the corrections. To the extent that it helps understanding, such a map is capable of being represented visually and FIG. 4 comprises such a representation of a global correction map.

Whereas the visual display representation is actually/according to the information and its dissemination, it will be appreciated that the format of the information lends itself to data compression techniques employed with such two-dimensional images in order to reduce the size of the data file or information for dissemination.

A lossless or lossy compression map be employed, but in this embodiments the server effects a lossy image compression; the preferred compression is in accordance with the JPEG2000 standard (wavelet-based) although other standards, such as JPEG (cosine based) or other techniques such as simple sub-sampling may be used, to reduce the file size of the information.

Figure 5:
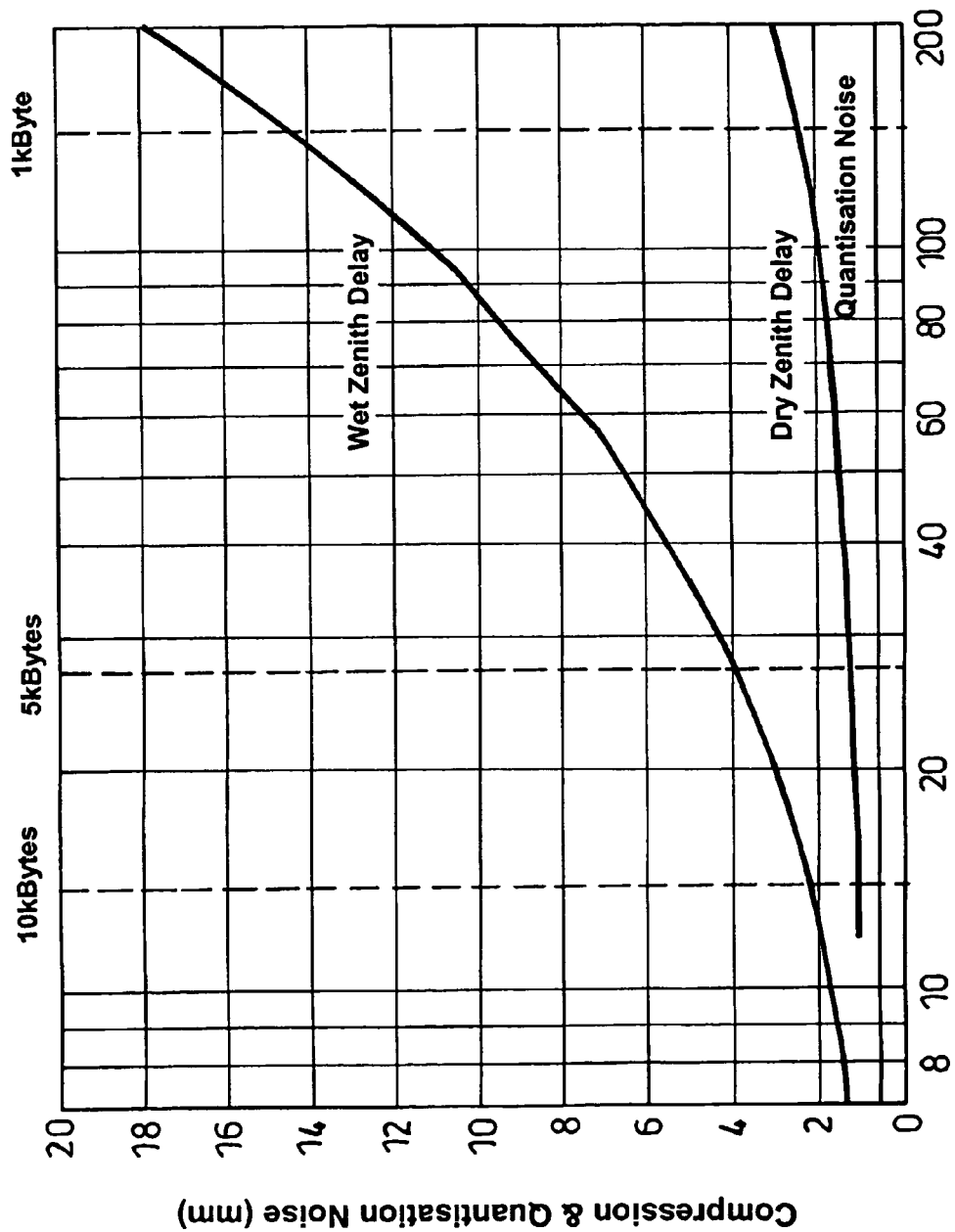
FIG. 5 is a graphical representation of how noise affects compression.

At this point it is appropriate to refer again to the user receiver. Insofar as the correction data signal is received from the GNSS (or the) satellite with the usual signals, no special receiving circuitry is needed. The correction (image) data set is passed to processor zenith delay computation which decodes the image for use of the individual pixel values as corrections as described above. Such decoding may be accomplished by a hardware feature built into the receiver or such decoding may be achieved by software loaded into the central processor of receiver; software for JPEG image file decompression is well known For example, if the file size of the uncompressed image is about 141 kb a compression factor of 35 (reducing files size to 4 kb) indicates little compression noise, but in a greater compression of 140 (to 1 kb) compression noise is evident. This is also shown graphically in FIG. 5.

It will be appreciated that the conditions for wet delay functions are far more complex and produce greater file sizes than dry delay functions. Thus separating wet and dry delay functions which can reasonably expect compressed file sizes of the order 9 kb and 1 kb respectively, there is need to disseminate about 88,000 bits.

This data set may be transmitted as a single image to all satellites of a constellation group. In this embodiment, the ability to effect data transmission at such a low rate is achieved by effecting the transmission to the GNSS satellites, with the full images at high transmission rate/long duration or only part of the image associated with the map region associated with a particular satellite or split amongst the satellites for each too receive only the part related to it, permitting a further factor of three reduction in required reception time; that is, transmission and reception would take about 2 minutes at a data rate of 250 bits/sec.

Thus each of the GNSS satellites is able to broadcast, with the normal signals, correction signals that each user receiver can employ with the zenith tropospheric delay modelling to effect a correction to values employed with the model in accordance with substantially current meteorological conditions pertaining to its location.

It will be appreciated that the rate of data dissemination is of both technical and economic importance. Firstly, the data transmission capacity available for slotting in the additional information is limited, at least in current implementations of GNSS.

Whereas for other types of data the solution may be to prolong the duration of the transmission event, in the case of updating weather dependent data this is not a suitable option. Insofar as weather changes and weather features move over the earth's surface and thus the grids employed in the meteorological model, there is a currency element, that is, a time interval and/or distance for which a desired tropospheric delay value is valid. It is believed that such currency time is of the order of one hour and/or grid size of 50 to 90 km. Thus, is a user is to rely upon meteorogically generally tropospheric delay values (by way of a correction) it should be within such validity time or position for which generated. Thus, in terms of transmission o a user, transmission must be at such a rate that the user can receive and process the information while it is still valid. Satellite transmission rates are both slow in bit rate and intermittent in availability for downloading such correction information. Thus, there is an imperative to effect a data reduction to accommodate transfer of a correction data (image) set whilst the data retains viability.

Furthermore, the time taken to download the correction data (image) set should not be unduly long as to cause the user to decline to wait for the time it takes to effect the download, decompress the image data file and compute position.

Thus, it is important to effect the degree of data reduction/image compression that achieves these various objectives.

Having regard to the above discussion of viability of delay values (and derived corrections) it should be noted that employing data based on NWP model approach it is in practice possible to predict the weather conditions and derive tropospheric delays for any given point in advance, up to several hours, notwithstanding that the viability of predicted tropospheric delay is relatively small (as described above) once current for the predicted time.

Therefore, it is possible to develop not only a set of tropospheric delays (as Zenith tropospheric delays) associated with a regions grid points but also to develop corresponding sets predicted for times in the future. That is, the server can derive a prediction set of correction sets.

This may be useful if the server can only devote itself periodically to developing delay corrections, as the prediction set can be stored and its members, correction sets for a particular time, be retrieved when that time is current and the set valid.

Alternatively, such a prediction set could be transmitted and stored within the satellite for retrieval and re-transmission of correction sets at times for which the validity is current, or analogously stored in the receiver for retrieval.

Notwithstanding the ability to both produce and upload prediction sets of data, in practice, at the moment, the data transmission bottle neck is downloading from the satellite (particularly a GNSS satellite) to the user.

In order to reduce the size of the correction data set filed to be transmitted by a satellite to a user, it may be arranged to transmit only delay corrections applicable to users within range, that is, within sight of the satellite, whilst ignoring data for users at other points of the globe. This may be achieved by the server determining which part of the correction data set to upload to any particular satellite, having regard to users who can access it, or the server may upload global data set but the satellite determine which part of the set to re-transmit.

The above description has concentrated on describing the derivation, communication and usage of corrections to Zenith tropospheric delays which represent major sources of positioning errors not correctable by the user receiver first model.

As mentioned above, the first model also employs a mapping function that employs parameters that also depend upon the atmosphere and are accommodated by elements used in the climate model, that is, a function of time of year (a) latitude (b) and altitude (c). These may also be corrected by correction sets derived in the server. This mapping function may be expressed as:

$$m(\epsilon, a, b, c) = 1 + \cfrac{a}{1 + \cfrac{b}{\sin(\epsilon) \cfrac{a}{\sin(\epsilon) + \cfrac{b}{\sin(\epsilon) + c}}}} \quad (2\text{-}1)$$

where $\epsilon$ is the elevation angle.
This may be further expressed as:

$$m(\varepsilon, a, b, c) = \cfrac{1 + \cfrac{a_0 + \Delta a}{1 + \cfrac{b_0 + \Delta b}{1 + c_0 + \Delta c}}}{\sin(\varepsilon) + \cfrac{a_0 + \Delta a}{\sin(\varepsilon) + \cfrac{b_0 + \Delta b}{\sin(\varepsilon) + c_0 + \Delta c}}} \quad (2\text{-}2)$$

where $a_0$, $b_0$ and $c_0$ are the first model values and $\Delta a$, $\Delta b$, $\Delta c$ are corrections to be applied thereto to effect mapping of elevation derivable by the meteorological model.

By a fitting process operated such that sum of the squares of the residuals between the equation (2-2) and the ray traced (truth) is minimised. Thus a set of correction values may be derived composed of $\Delta a$, $\Delta b$ and $\Delta c$ as a similar data image file or superimposed upon the Zenith correction data image file by increasing the word length thereof to include word elements comprising these corrections.

Transmission and reception anti-coding is as before except that the receiver now has correction values to employ with the parameters of the mapping function whereby both the Zenith delay and its mat values are more accurately represented.

It will be appreciated that it is possible to include in elevation mapping functions the parameters of longitude and time of day, and the above approach to deriving a numerical solution therefor may be extended thereto.

Although it is convenient and in many ways advantageous to employ NWP, other meteorological sources may be used on combination therewith to augment the data available. Any other meteorological model that takes a three dimensional view of the atmosphere may be employed instead of the NWP. As will be appreciated, the NWP derives tropospheric delays are defined for a grid having a cell size limited by the NWP model in use. Many weather features that have a high moisture content and can effect tropospheric delay, such a thunder storms, may be below the resolution threshold of the NWP model. However, there exists a number of sources of data such as satellite images of an essentially dimensional nature that can identify with high resolution the existence of such features and the information contained therein can be employed to vary the NWP values for a particular cell of the grid to take such features into account across the NWP grid.

The above described embodiment is intended to enable a user receiver having a built in first, non-meteorological model to determine its position more accurately than is possible by use of the model alone. It will be appreciated that part of the computation solution is to derive a time values to the accuracy permitted by the model's interpretation of tropospheric delay. For some users, it is the time function that is of importance and such user may know the precise location of a fixed receiver.

Figure 6:
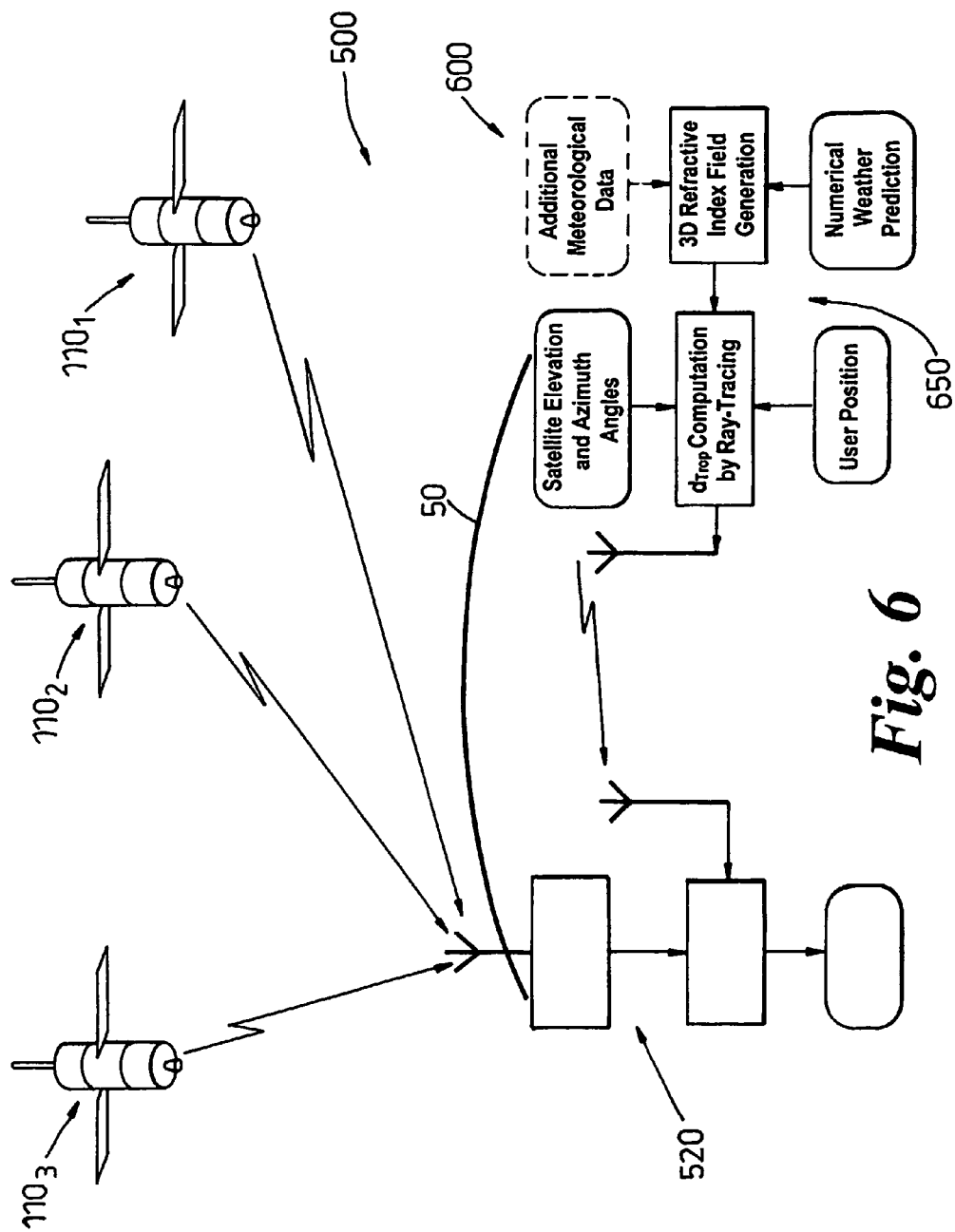
FIG. 6 is a schematic illustration, similar to FIG. 2 of a second embodiment of the invention for a user station at a known position.

Referring to FIG. 6, this shows a schematic representation of a second embodiment of GNSS 500. A user receiver 520 is similar to the user receiver 120 but lacks (or has disabled) the first, non-meteorological model.

A server 600 is similar to the server 200 except that the first, non-meteorological model is also omitted and transmission is terrestrial rather than via satellite. Within the server, there is provided a meteorological processor 650 that uses three-dimensional refractive index field generation as described above, based upon NWP data that may be augmented by additional meteorological data, and effects ray tracing capable of deriving tropospheric delay values for a region covered by the NWP data. However, the server also receives or has stored therein, data relating to, or identifying the position of the user in earth co-ordinates and satellite elevation and azimuth angle with respect to the user. Thus the server does not model a simple zenith delay value but is able to compute from the raw data an appropriate tropospheric delay value or select one of a number of delay values mapped to the correct angles for the user's location. The server thus communicates the actual delay value to the user by wireless or wired means so that the user can derive a more accurate time value and if appropriate confirm its position. It will be appreciated that insofar as the meteorological data is derived for the purpose of forecasting, the derivation of delay value and transmission need not be in real time, but could be in advance of its use. Not only may a single tropospheric delay value be derived and transmitted this way, but in a manner similar to that described for the system 200, a prediction set of delay values may be derived and stored, each member of the set being retrieved and used when it becomes current, having regard to the time for which forecast. If the server is used for other purposes, then a prediction set may be stored in the server for transmission of its members at appropriate times or the set may be transmitted to, and stored in, the user receiver and set members retrieved as they become current. Also, it will be appreciated that transmission may be via satellite, using data reduction if necessary.

The above disclosure may be summarised as follows:

The tropospheric correction server takes as input regional or global numerical weather prediction model information including pressure, temperature and humidity data. Additional meteorological data, for example high-resolution water vapour estimates from infrared satellite observations, could be used to augment NWP data and aid in the correction of very small meteorological features (for example local convective storms).

The tropospheric correction server computes the three-dimensional refractive index field from the meteorological data. Wet and dry zenith delays are computed for a gridded area, corresponding to the NWP coverage, at heights corresponding to a terrain database (that may be the NWP terrain). In the case of the server 200, for the same grid locations including height, wet and dry zenith delays are computed from a prior model. The server then computes the difference between prior and meteorological observation based zenith delays as a percentage. The gridded data set of wet and dry percentage corrections are then quantised and compressed using a lossy image compression technique. The compressed image, including data required for image decoding, is then disseminated to the satellite uplink station (part of the satellite navigation system ground infrastructure). The image data relates to the current atmospheric state and may also include several hours of predicted images. The uploading of data can be from one or more uplink stations and can be uplinked to one or more satellites. The data can be global or regional in nature. The data sent to each satellite can be area-limited such that the satellite constellation provides global coverage although each satellite's data.

The batch-uploading to satellites of several hours of predicted images maybe used to reduce the burden on the satellite navigation system ground infrastructure. Each satellite broadcasts the most applicable, most current, tropospheric image as part of the satellite navigation system's navigation data.

The user's satellite navigation signal tracking system receives the tropospheric images, the standard navigation data including satellite orbit determination parameters and makes pseudorange and accumulated carrier observations. The wet and dry compressed tropospheric correction images are decompressed. The prior wet and dry zenith delays are computed. The prior wet and dry zenith delay model is the same as that used in the tropospheric correction server. The user wet and dry zenith delays, corresponding to the user location, is then computed using interpolation between adjacent gridded data points.

Wet and dry zenith propagation delays are then converted into satellite specific pseudorange corrections using satellite elevation mapping functions. Finally the standard navigation solution is computed, but with the addition of meteorological-observation-based tropospheric delay corrections.

A more comprehensive discussion on the factors that affect the implementation of a positioning system, numerical weather prediction techniques and deriving corrected tropospheric delay information from meteorological measurements, and based may be found in the paper "Tropospheric Delay Modelling and Correction Dissemination using Numerical Weather Prediction Fields" by M Powe, J Butcher and J Owen given in the Proceedings of GNSS 2003 and included in the application from which priority for the present application is claimed, and included herein by reference.

The invention claimed is:

1. A method of obtaining tropospheric delay data for use in increasing the accuracy with which the location of a receiver in a global navigation satellite system (GNSS) can be determined, the method comprising the steps of:
generating a first set of approximate tropospheric delay values applicable to various receiver geographical locations from a first model at a location remote from said receiver;
generating a second set of accurate tropospheric delay values applicable to said various receiver geographical locations from a second model, which is a meteorological model, at a location remote from said receiver;
developing a set of tropospheric delay value modifications applicable to said first model so that together, said first model and said tropospheric delay value modifications can provide a set of tropospheric delay values substantially in agreement with said second set of accurate tropospheric delay values; and
communicating said set of tropospheric delay value modifications to said receiver.

2. A method according to claim 1 wherein the first model is based on non-meteorological parameters.

3. A method according to claim 2 wherein said non-meteorological parameters comprise at least one of time of year, latitude and altitude.

4. A method according to claim 3 wherein said non-meteorological parameters comprise at least one of longitude and time of day.

5. A method according to claim 4 wherein said sets of tropospheric delay values comprise zenith tropospheric delay values.

6. A method according to claim 4 wherein the delay value modifications are the differences between corresponding values of:
the first set of approximate tropospheric delay values attributable to the first model; and
the second set of accurate tropospheric delay values attributable to the second meteorological model.

7. A method according to claim 3 wherein said sets of tropospheric delay values comprise zenith tropospheric delay values.

8. A method according to claim 7 wherein the delay value modifications are the differences between corresponding values of:
the first set of approximate tropospheric delay values attributable to the first model; and
the second set of accurate tropospheric delay values attributable to the second meteorological model.

9. A method according to claim 3 wherein the delay value modifications are the differences between corresponding values of:
the first set of approximate tropospheric delay values attributable to the first model; and
the second set of accurate tropospheric delay values attributable to the second meteorological model.

10. A method according to claim 2 wherein said sets of tropospheric delay values comprise zenith tropospheric delay values.

11. A method according to claim 10 wherein the delay value modifications are the differences between corresponding values of:
the first set of approximate tropospheric delay values attributable to the first model; and
the second set of accurate tropospheric delay values attributable to the second meteorological model.

12. A method according to claim 2 wherein the delay value modifications are the differences between corresponding values of:
the first set of approximate tropospheric delay values attributable to the first model; and
the second set of accurate tropospheric delay values attributable to the second meteorological model.

13. A method according to claim 1 wherein said sets of tropospheric delay values comprise zenith tropospheric delay values.

14. A method according to claim 13 wherein the first model contains a mapping function relating tropospheric delay values at a given elevation angle to the zenith tropospheric delay values.

15. A method according to claim 14 wherein said set of tropospheric delay value modifications comprises a set of modifications for use with the mapping function of the first model.

16. A method according to claim 13 wherein the delay value modifications are the differences between corresponding values of:
the first set of approximate tropospheric delay values attributable to the first model; and
the second set of accurate tropospheric delay values attributable to the second meteorological model.

17. A method according to claim 1 wherein the delay value modifications are the differences between corresponding values of:
the first set of approximate tropospheric delay values attributable to the first model; and
the second set of accurate tropospheric delay values attributable to the second meteorological model.

18. A method according to claim 17 in which the delay value modifications are expressed as a fractional change from the values of the first set of tropospheric delay values.

19. A method according to claim 1 wherein the set of delay value modifications is expressed as a data array, each modification having a value which is determined for an individual grid point on at least a part of the earth's surface.

20. A method according to claim 19 wherein said set of modifications is expressed as a digital data file.

21. A method according to claim 20 wherein said digital data file is a greyscale image of multi-bit words, each word representing a location of the region.

22. A method according to claim 21 comprising the further steps of applying data reduction to the set of tropospheric delay value modifications to derive a reduced set of tropospheric delay value modifications for communication to a user.

23. A method according to claim 22 wherein the data reduction is an image compression process.

24. A method according to claim 23 comprising reducing the data size by lossy data reduction.

25. A method according to claim 22 comprising reducing the data size by lossy data reduction.

26. A method according to claim 24 comprising effecting data reduction by reducing the correction set data file according to a JPEG 2000 or JPEG 90 standard.

27. A method according to claim 22 comprising applying data reduction sufficient to permit transmission of all or part of said set of delay value modifications useable by said receiver within a time dictated by transmission availability and transmission rate of the satellite, said time being substantially lower than the validity time of the meteorological information used by the meteorological model.

28. A method according to claim 27 wherein the data reduction is arranged to permit delay value modification data transmission to a receiver at a data rate in the range 25 to 500 bit/s.

29. A method according to claim 28 wherein the data reduction is arranged to permit delay value modification data transmission in the range 200 to 250 bits/s.

30. A method according to claim 1 wherein said accurate tropospheric delay values are derived by a ray tracing technique.

31. A method according to claim 30 wherein said accurate tropospheric delay values are derived by three-dimensional refractive index field generation.

32. A method according to claim 31 wherein said meteorological model or each said tropospheric delay value modification is augmented by directly observed meteorological data.

33. A method as claimed in claim 31 comprising predicting accurate tropospheric delay values for one or more times in the future from said meteorological information and developing a prediction set of delay value modifications for said geographic region of the earth's surface, whereby each member of said prediction set describes a delay value modification that becomes current as a function of time from development.

34. A method as claimed in claim 33 comprising communicating said prediction set of delay value modifications as a batch and using members of the set as the time for which each was predicted becomes current in respect of the forecast.

35. A method according to claim 30 wherein said meteorological model or each said tropospheric delay value modification is augmented by directly observed meteorological data.

36. A method according to claim 35 wherein said meteorological model or each said tropospheric delay value modification is augmented by directly observed meteorological data.

37. A method according to claim 36 wherein said directly observed meteorological data is derived as a data set relating to a region of the earth's surface corresponding to at least part of the NWP data.

38. A method as claimed in claim 35 wherein said region is substantially global.

39. A method according to claim 35 wherein said directly observed meteorological data is derived as a data set relating to a region of the earth's surface corresponding to at least part of the NWP data.

40. A method as claimed in claim 39 wherein said region is substantially global.

41. A method as claimed in claim 39 comprising predicting accurate tropospheric delay values for one or more times in the future from said meteorological information and developing a prediction set of delay value modifications for said geographic region of the earth's surface, whereby each member of said prediction set describes a delay value modification that becomes current as a function of time from development.

42. A method as claimed in claim 35 wherein said region is substantially global.

43. A method as claimed in claim 35 comprising predicting accurate tropospheric delay values for one or more times in the future from said meteorological information and developing a prediction set of delay value modifications for said geographic region of the earth's surface, whereby each member of said prediction set describes a delay value modification that becomes current as a function of time from development.

44. A method according to claim 1 wherein said meteorological model is based on numerical weather prediction (NWP) data for a region of the earth.

45. A method according to claim 44 wherein said meteorological model or each said tropospheric delay value modification is augmented by directly observed meteorological data.

46. A method as claimed in claim 45 comprising predicting accurate tropospheric delay values for one or more times in the future from said meteorological information and developing a prediction set of delay value modifications for said geographic region of the earth's surface, whereby each member of said prediction set describes a delay value modification that becomes current as a function of time from development.

47. A method as claimed in claim 44 wherein said region is substantially global.

48. A method as claimed in claim 47 comprising predicting accurate tropospheric delay values for one or more times in the future from said meteorological information and developing a prediction set of delay value modifications for said geographic region of the earth's surface, whereby each member of said prediction set describes a delay value modification that becomes current as a function of time from development.

49. A method as claimed in claim 44 comprising predicting accurate tropospheric delay values for one or more times in the future from said meteorological information and developing a prediction set of delay value modifications for said geographic region of the earth's surface, whereby each member of said prediction set describes a delay value modification that becomes current as a function of time from development.

50. A method according to claim 1 whereby the set of tropospheric delay value modifications is communicated to said receiver on a communication channel or data link.

51. A method as claimed in claim 50 comprising communicating said prediction set of delay value modifications as a batch and using members of the set as the time for which each was predicted becomes current in respect of the forecast.

52. A method according to claim 1 comprising communicating at least part of the set of delay value modifications to at least one orbiting satellite ($101_1$, $102_2$, ...) and re-transmitting at least part of said set to said receiver from a said orbiting satellite.

53. A method according to claim 1 wherein only that part of the set of delay value modifications that can be of use to a receiver in a region within range of a satellite ($101_1$, $102_2$, ...) is communicated to said satellite.

54. An apparatus adapted to obtain tropospheric delay data comprising:
    a first set of approximate tropospheric delay values applicable to at least one remote receiver and a first model, the receivers are positioned at various geographical locations remote from the first model;
    a second set of accurate tropospheric delay values applicable to said various receiver geographical locations from a second model, which is a meteorological model, at a location remote from said receiver;
    a set of tropospheric delay value modifications applicable to said first model so that together, said first model and said tropospheric delay value modifications can provide a set of tropospheric delay values substantially in agreement with said second set of accurate tropospheric delay values; and
    at least one of a communication channel and a data link for communicating said set of tropospheric delay value modifications to said receiver.

55. A method of reducing tropospheric delay errors in a global navigation satellite system (GNSS) comprising the steps of:
    generating a first set of approximate tropospheric delay values from a first model applicable to signals received from a plurality of satellites;
    receiving a set of tropospheric delay value modifications derived from a second model, which is a meteorological model; and
    correcting the first set of approximate tropospheric delay values in accordance with the set of tropospheric delay value modifications.

56. A method according to claim 55 wherein the method is employed to more accurately determine the position of the receiver, said method including the further steps of computing an approximate position of the receiver relative to earth's surface after the step of generating the first set of approximate tropospheric delay values, and then computing an accurate location of the receiver after the step of correcting the first set of tropospheric delay values in accordance with the set of tropospheric delay value modifications.

57. A global navigation satellite system (GNSS) receiver which can compute, with greater accuracy, the location of said receiver, or the current time, said receiver comprising:
    means operable to generate a first set of approximate tropospheric delay values applicable to signals received from a plurality of said satellites and compute an approximate position of the receiver relative to earth's surface or time, characterized in that the receiver also comprises;
    means operable to receive a set of tropospheric delay value modifications derived from meteorological data,
    means to correct the first set of approximate tropospheric delay values in accordance with the set of tropospheric delay value modifications; and
    means to compute the location of the receiver or the time.

58. A receiver as claimed in claim 57 wherein said means to correct the first set of approximate tropospheric delay values is operable to effect one of interpolation and extrapolation of said modifications according to the computed position of the user relative to locations for which the modifications have been derived.

59. A receiver adapted for correcting tropospheric delay errors in a global navigation satellite system (GNSS) comprising: a receiver configured to generate a first set of approximate tropospheric delay values from a first model applicable to signals received from a plurality of satellites, wherein the satellite receiver receives a set of tropospheric delay value modifications derived from a second model, which is a meteorological model; and corrects the first set of approximate tropospheric delay values in accordance with the set of tropospheric delay value modifications.

60. A receiver according to claim 59 wherein the receiver can determine its location more accurately by computing an approximate position of the receiver relative to earth's surface after the step of generating the first set of approximate tropospheric delay values, and then computing an accurate location of the receiver after the step of correcting the first set of tropospheric delay values in accordance with the set of tropospheric delay value modifications.

* * * * *

UNITED STATES PATENT AND TRADEMARK OFFICE
CERTIFICATE OF CORRECTION

PATENT NO. : 7,877,207 B2
APPLICATION NO. : 10/553682
DATED : January 25, 2011
INVENTOR(S) : Matthew D. Powe et al.

Page 1 of 1

It is certified that error appears in the above-identified patent and that said Letters Patent is hereby corrected as shown below:

At column 20, claim number 26, line number 25, change "according to claim 24" to "according to claim 25".

At column 21, claim number 38, line number 9, change "claimed in claim 35" to "claimed in claim 36".

Signed and Sealed this
Tenth Day of May, 2011

David J. Kappos
*Director of the United States Patent and Trademark Office*